(12) United States Patent
Lee

(10) Patent No.: US 12,148,287 B2
(45) Date of Patent: Nov. 19, 2024

(54) VEHICLE, CONTROL METHOD THEREOF, AND ANTENNA DEVICE

(71) Applicants: HYUNDAI MOTOR COMPANY, Seoul (KR); KIA CORPORATION, Seoul (KR)

(72) Inventor: Sang Heun Lee, Seoul (KR)

(73) Assignees: Hyundai Motor Company, Seoul (KR); KIA Corporation, Seoul (KR)

(*) Notice: Subject to any disclaimer, the term of this patent is extended or adjusted under 35 U.S.C. 154(b) by 35 days.

(21) Appl. No.: 17/969,244

(22) Filed: Oct. 19, 2022

(65) Prior Publication Data
US 2023/0133571 A1    May 4, 2023

(30) Foreign Application Priority Data
Nov. 4, 2021   (KR) .................... 10-2021-0150352

(51) Int. Cl.
| | | |
|---|---|---|
| *H01Q 1/06* | (2006.01) | |
| *B60Q 1/26* | (2006.01) | |
| *B60Q 1/48* | (2006.01) | |
| *G08B 5/36* | (2006.01) | |
| *H01Q 1/32* | (2006.01) | |

(52) U.S. Cl.
CPC ............. *G08B 5/36* (2013.01); *B60Q 1/26* (2013.01); *B60Q 1/482* (2013.01); *H01Q 1/06* (2013.01); *H01Q 1/3275* (2013.01)

(58) Field of Classification Search
CPC ............. H01Q 1/06; B60Q 1/482; B60Q 1/26
See application file for complete search history.

(56) References Cited

U.S. PATENT DOCUMENTS

| | | | | |
|---|---|---|---|---|
| 5,786,758 A | * | 7/1998 | Bullock | B60R 13/00 340/471 |
| 6,580,368 B1 | * | 6/2003 | Jacobs | B60Q 1/482 116/28 R |
| 7,119,679 B1 | * | 10/2006 | Crom | B60Q 1/482 340/426.22 |
| 10,005,387 B2 | * | 6/2018 | Co | B60Q 1/482 |
| 10,123,401 B2 | * | 11/2018 | Lin | G08G 1/205 |
| 11,283,163 B2 | * | 3/2022 | Thoday | H01Q 1/3275 |
| 11,518,299 B2 | * | 12/2022 | Hu | B05B 17/08 |
| 2014/0361904 A1 | * | 12/2014 | Gaboury | G08B 3/10 340/692 |
| 2018/0076512 A1 | * | 3/2018 | Chen | H01Q 1/3275 |
| 2020/0328762 A1 | * | 10/2020 | Lee | H01Q 5/328 |

* cited by examiner

*Primary Examiner* — John A Tweel, Jr.
(74) *Attorney, Agent, or Firm* — Morgan, Lewis & Bockius LLP

(57) ABSTRACT

An antenna apparatus includes a bottom member mounted on the vehicle, an antenna module including at least one antenna and disposed on a first portion of the bottom member, at least one light emitting element disposed on a second portion of the bottom member, and a cover member coupled to the bottom member to surround the antenna module and the at least one light emitting element therein.

10 Claims, 8 Drawing Sheets

VEHICLE, CONTROL METHOD THEREOF, AND ANTENNA DEVICE

CROSS-REFERENCE TO RELATED APPLICATION(S)

The present application claims priority to Korean Patent Application No. 10-2021-0150352, filed on Nov. 4, 2021, the entire contents of which is incorporated herein for all purposes by this reference.

BACKGROUND OF THE PRESENT DISCLOSURE

Field of the Present Disclosure

The present disclosure relates to a vehicle, a control method thereof, and an antenna apparatus.

Description of Related Art

Recently, in places where many vehicles are parked, it is easy to see persons walking around while pressing a button on their smart key several times to find their vehicle. Accordingly, the smart key for a vehicle is often used to find the location of the vehicle.

When a driver presses a vehicle door open or door close button on the smart key near to the location where a vehicle is parked, the vehicle outputs a sound such as "beep" and flickers lamps. The driver may check the location of the vehicle by the sound output and the flickering of the lamps of the vehicle.

However, in the case of the vehicle sound output, the sound output helps a driver to predict the approximate direction of the vehicle, but it is difficult for the driver to specify a precise location of the vehicle through the sound of the vehicle. In places such as an underground parking lot, it is difficult for the driver to predict a direction of the vehicle because the sound of the vehicle echoes. Furthermore, when the sound of the vehicle is too low, it is difficult to find a direction in which the vehicle is located, and when the sound of the vehicle is too loud, it may become an unpleasant noise to the surroundings.

Furthermore, in the case of the flickering of the vehicle lamps, the driver may not be able to check the flickering. Because the lamps are generally located at front and rear surfaces of the vehicle, in places where several other vehicles are parked, the lamps of the vehicle may be obscured by other vehicles. Accordingly, the driver may not be aware of the flickering of the lamps of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle, a control method thereof, and an antenna apparatus configured for facilitating a user to check a location of the vehicle by manipulating a smart key.

For example, the present disclosure may provide a new type of antenna apparatus (also referred to as shark fin antenna) in which a transparent cover is applied to a roof of a vehicle and a light emitting element is mounted therein.

Furthermore, the vehicle according to the present disclosure may cause the light emitting element mounted on the new type of antenna apparatus to output light when the user manipulates the smart key, and thus the user may easily find the location of the vehicle.

Additional aspects of the present disclosure will be set forth in part in the description which follows, and in part, will be obvious from the description, or may be learned by practice of the present disclosure.

In accordance with an aspect of the present disclosure, an antenna apparatus includes a bottom member mounted on the vehicle, an antenna module including at least one antenna and disposed on a first portion of the bottom member, at least one light emitting element disposed on a second portion of the bottom member, and a cover member coupled to the bottom member to surround the antenna module and the at least one light emitting element therein.

The at least one light emitting element may include at least one of at least one first light emitting element and at least one second light emitting element, and the antenna apparatus may further include at least one of a lens mounted above the at least one first light emitting element and a reflector mounted above the at least one second light emitting element.

The antenna apparatus may further include a support member disposed on the second portion of the bottom member and a lens mounted above the support member, wherein the at least one light emitting element may be disposed on each side and an upper end portion of the support member.

The antenna apparatus may further include at least one light emitting element disposed on a third portion of the bottom member.

The bottom member may have a shape in which a cross section is widened from the second portion toward the first portion.

The cover member may be made of a transparent or translucent material.

The antenna apparatus may further include a transmitter provided to transmit at least one of an infrared signal and an electromagnetic wave signal.

In accordance with an aspect of the present disclosure, a vehicle includes an antenna apparatus including an antenna module and at least one light emitting element, the antenna apparatus being mounted on a roof panel of the vehicle, an antenna provided to receive a signal of a smart key, and a controller configured to control light emission of the at least one light emitting element included in the antenna apparatus when the signal is received through the antenna.

The controller may be configured to control the at least one light emitting element to output light of a predetermined color based on a strength of the signal received through the antenna.

The controller may be configured to determine a distance between the smart key and the vehicle based on the strength of the signal received through the antenna, and control the at least one light emitting element to output light of the predetermined color based on the distance between the smart key and the vehicle.

The controller may be configured to control the at least one light emitting element so that a predetermined visual image is formed outside by the light of the at least one light emitting element.

The at least one light emitting element may include at least one first light emitting element and at least one second light emitting element, and the antenna apparatus may further include a lens mounted above the at least one first light emitting element and a reflector mounted above the at least one second light emitting element.

The controller may be configured to control light emission of the at least one first light emitting element based on a first signal of the smart key received through the antenna, and control light emission of the at least one second light emitting element based on a second signal of the smart key received through the antenna.

The controller may identify whether the vehicle is located in an indoor space or an outdoor space based on a signal of a satellite navigation system received through the at least one antenna, control light emission of the at least one first light emitting element based on the signal received through the antenna when the vehicle is located in the indoor space, and control light emission of the at least one second light emitting element based on the signal received through the antenna when the vehicle is located in the outdoor space.

The vehicle may further include a speaker, and a plurality of lamps disposed on a front portion and a rear portion of the vehicle, wherein the controller may output a predetermined sound through the speaker when the signal is received through the antenna, and is configured to control the plurality of lamps to emit light.

In accordance with an aspect of the present disclosure, a method of controlling a vehicle includes receiving a signal of a smart key through an antenna of the vehicle, and controlling at least one light emitting element included in an antenna apparatus mounted on a roof panel of the vehicle to emit light in response to the receiving of the signal of the smart key.

The controlling of the at least one light emitting element to emit light may include controlling the at least one light emitting element to output light of a predetermined color based on a strength of the signal of the smart key.

The controlling of the at least one light emitting element to emit light may include determining a distance between the smart key and the vehicle based on the strength of the signal of the smart key, and controlling the at least one light emitting element to output light of the predetermined color based on the distance between the smart key and the vehicle.

The at least one light emitting element may include at least one first light emitting element and at least one second light emitting element, and the controlling of the at least one light emitting element to emit light may include controlling light emission of the at least one first light emitting element when the signal of the smart key is a first signal, and controlling light emission of the at least one second light emitting element when the signal of the smart key is a second signal.

The at least one light emitting element may include at least one first light emitting element and at least one second light emitting element, the control method may further include identifying whether the vehicle is located in an indoor space or an outdoor space based on a signal of a satellite navigation system received through the antenna apparatus, and the controlling of the at least one light emitting element to emit light may include controlling light emission of the at least one first light emitting element based on the signal of the smart key when the vehicle is located in the indoor space, and controlling light emission of the at least one second light emitting element based on the signal of the smart key when the vehicle is located in the outdoor space.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
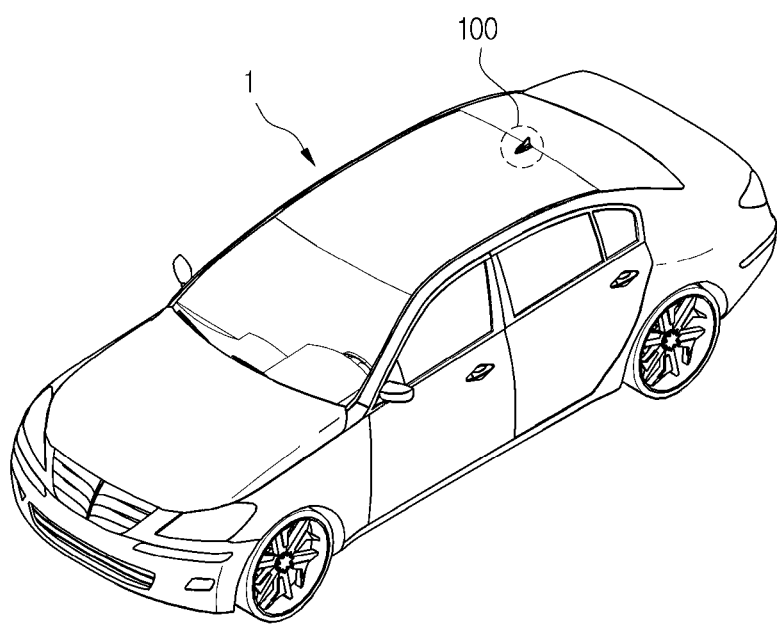
FIG. 1 illustrates a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all the elements of the embodiments, and duplicative contents between general contents or embodiments in the field of the present disclosure will be omitted. The terms 'part,' 'module,' 'member,' and 'block' used in the present specification may be embodied as software or hardware, and it is also possible for a plurality of 'units,' 'modules,' 'members,' and 'blocks' to be embodied as one component, or one 'unit,' and 'block' to include a plurality of components according to various exemplary embodiments of the present disclosure.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

Throughout the specification, when an element is referred as to be located "on" another element, this includes not only a case in which an element is in contact with another element but also a case in which another element exists between two elements.

The terms 'first,' etc. are used to distinguish one element from another element, and the elements are not limited by the above-mentioned terms.

The singular forms "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the operation principle and embodiments of the present disclosure will be described with reference to the accompanying drawings.

FIG. 1 illustrates a vehicle according to an exemplary embodiment of the present disclosure.

Referring to FIG. 1, a vehicle 1 may include a vehicle body provided to form an exterior of the vehicle 1 and accommodate a driver and/or luggage, a chassis including components of the vehicle 1 other than the vehicle body, and electronic components provided to protect the driver or provide convenience to the driver. The vehicle body may form an internal space for the driver to stay, an engine compartment for accommodating an engine, and a trunk compartment for accommodating luggage. The chassis may include devices for generating power to drive the vehicle 1 under control of the driver and driving, braking, and steering the vehicle 1 using the power. The electronic components may provide control of the vehicle 1, the safety and convenience of the driver and passengers.

An antenna apparatus 100 for receiving wireless signals, such as radio signals, broadcast signals, and satellite signals, and transmitting and receiving signals with other vehicles, servers, and base stations may be provided on a roof panel of the vehicle 1.

Figure 2:
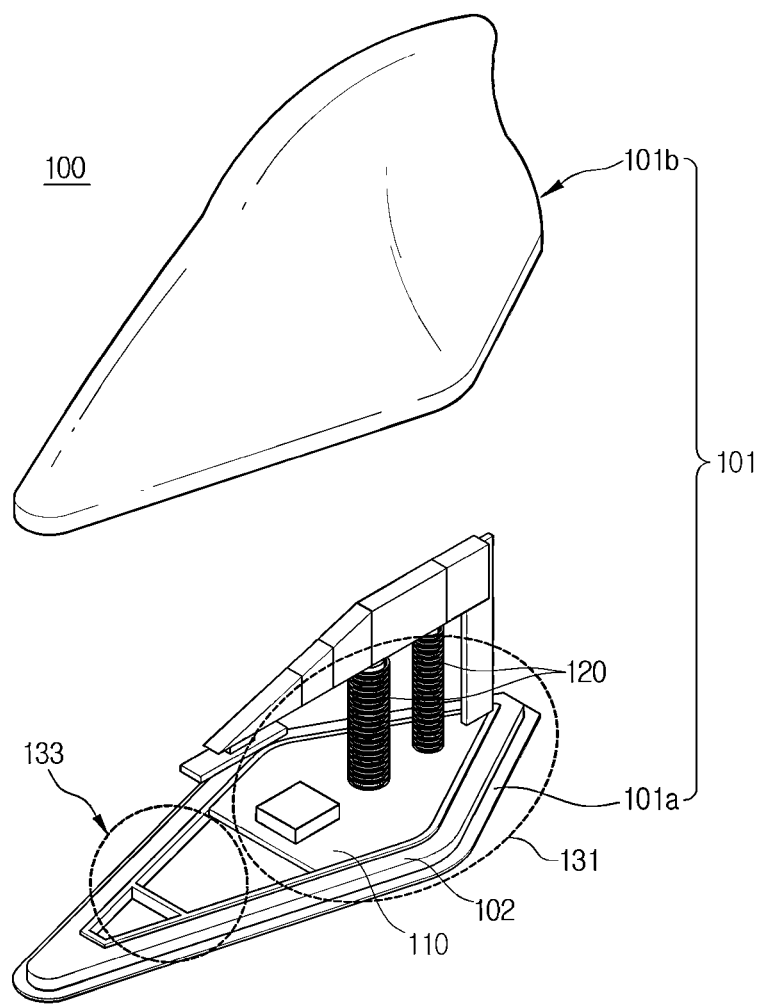
FIG. 2 illustrates a partial structure of an antenna apparatus according to an exemplary embodiment of the present disclosure.

FIG. 2 illustrates a partial structure of the antenna apparatus 100 according to an exemplary embodiment of the present disclosure.

Referring to FIG. 2, the antenna apparatus 100 may include a housing 101 including a bottom member 101a mounted on the roof panel of the vehicle 1 and a cover member 101b coupled to the bottom member 101a and covering components therein.

The bottom member 101a is made of synthetic resin, and may be attached to the vehicle body to prevent foreign substances from being introduced into a gap between the bottom member 101a and the cover member 101b and reduce an impact transmitted from the vehicle body.

The bottom member 101a may be provided at an upper rear side of the vehicle 1 so that a wireless signal reception rate is excellent because there is little possibility of interference with the surrounding components.

The bottom member 101a may be formed to have a wider cross section toward the rear of the vehicle 1 to reduce wind resistance and noise generated when the vehicle body moves.

For example, the bottom member 101a may have a shape in which the cross section thereof is widened from a second portion 133 to a first portion 131.

The cover member 101b may be made of a transparent or translucent plastic material. As the cover member 101b is made of a transparent or translucent material, when a light emitting element emits light, the light of the light emitting element may be recognized from the outside.

For example, the cover member 101b may include polycarbonate (PC), polymethyl methacrylate (PMMA), or the like.

For example, UV (ultraviolet rays) hard coding may be applied to the cover member 101b to enhance weather resistance and block UV rays.

For example, the housing 101 may be provided in a shark fin type.

An antenna module 110 as illustrated in FIG. 2 may be disposed on the first portion 131 of the bottom member 101a of the antenna apparatus 100.

For example, the antenna apparatus 100 includes a base member 102 disposed on the bottom member 101a and the antenna module 110 disposed on the base member 102.

The base member 102 may be coupled to the bottom member 101a by a method such as bonding and bolting, and may be coupled to the antenna module 110 by a bolting method.

The base member 102 provides a space for mounting the antenna module 110.

The antenna module 110 may be provided as a printed circuit board (PCB) having wiring formed by etching copper or the like on a substrate. The antenna module 110 may include a hole through which an electric wire passes.

The antenna module 110 may include one or more antennae 120 and a signal processing circuit for processing signals by amplifying or filtering the signals received from the antennae 120.

The antenna module 110 transmits a signal to an electronic control unit (ECU) or a terminal mounted inside the vehicle body.

The antenna module 110 extracts and optimizes signals of a preset frequency band, for example, a frequency modulation (FM) signal or amplitude modulation (AM) signal, a digital multimedia broadcasting (DMB) signal, a digital audio broadcasting (DAB) signal, an integrated services digital broadcasting-terrestrial (ISDB-T) signal, a long term evolution (LTE) signal, and/or a global positioning system (GPS) (or global navigation satellite system (GNSS)) signal.

The antenna module 110 as described above may be implemented as a single integrated antenna module by mounting components, such as a band pass filter (BPF), a switch, a tuner, a buffer, and a digital signal processor (DSP), on a circuit board.

The antenna 120 represents an antenna that receives a signal of one frequency band as a signal of a fundamental frequency band. The one frequency band may, as an exemplary embodiment of the present disclosure, be a frequency band of various signals such as a FM band, AM band, DMB (or DAB, ISDB-T) band, LTE band, and/or Global Positioning System (GPS) band (or GNSS band).

A coil antenna may be used as the antenna 120, but various other antennae such as a chip antenna and a microstrip patch antenna may also be used.

Furthermore, although not shown in FIG. 2, at least one light emitting element, which will be described later, may be mounted on the second portion 133 of the bottom member 101a. Detailed embodiments related to the light emitting element will be described with reference to FIGS. 3 to 7, and thus a detailed description thereof will be omitted.

Figure 3:
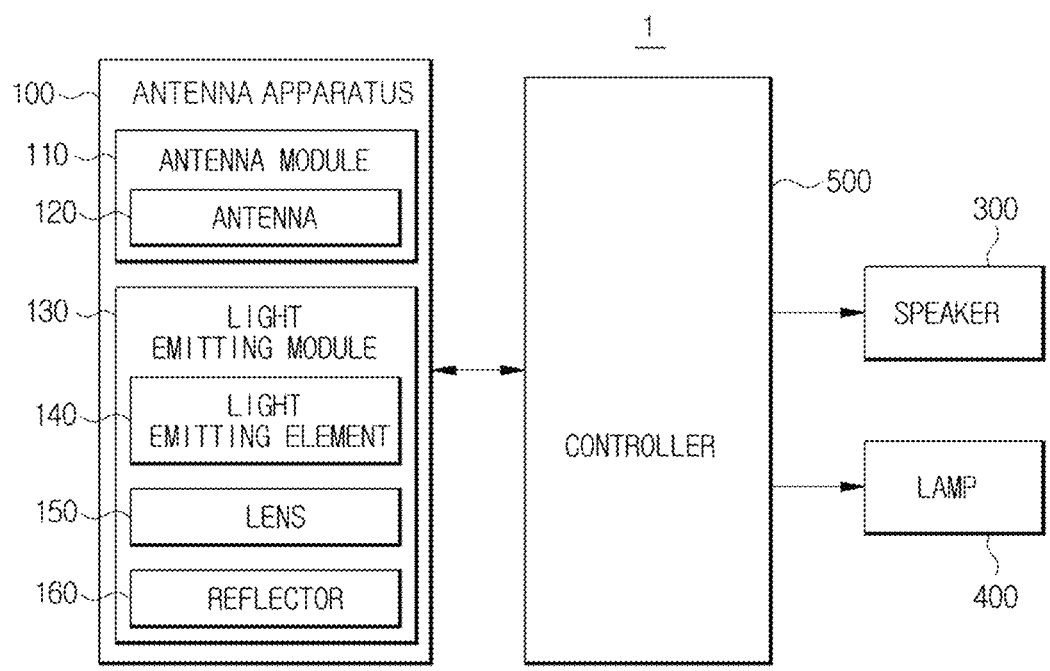
FIG. 3 is a block diagram of the vehicle according to an exemplary embodiment of the present disclosure.

FIG. 3 is a block diagram of the vehicle 1 according to an exemplary embodiment of the present disclosure.

Referring to FIG. 3, a vehicle 1 may include the antenna apparatus 100, an antenna 120, a speaker 300, a lamp 400, and/or a controller 500.

The antenna apparatus 100 may include the antenna module 110 and/or a light emitting module 130.

The antenna module 110 may include the one or more antennae 120.

The light emitting module 130 may include one or more light emitting elements 140, one or more lenses 150, and/or one or more reflectors 160.

The one or more light emitting elements 140 may include at least one of light emitting elements 141, 143, 144, 145, 146, 147, 148, and 149 of FIG. 4, FIG. 5, FIG. 6, and FIG. 7, which will be described later.

The lens 150 may include at least one of lenses 151 and 153 of FIGS. 4, 6, and 7, which will be described later.

The reflector 160 may include the reflector 160 of FIGS. 5 and/or 6, which will be described later.

The antenna 120 may receive a signal from a smart key of the vehicle 1 and/or transmit a signal to the smart key of the vehicle 1.

The speaker 300 may output a sound of the vehicle 1.

The lamp 400 may be disposed on the vehicle body of the vehicle 1, for example, a front portion and a rear portion of the vehicle, and a plurality of lamps 400 may be provided.

The controller 500 may control at least one other component (e.g., a device and/or software (software program)) of the vehicle 1, and may perform various data processing and operations.

The controller 500 may generate various control signals for controlling components in the antenna apparatus 100.

The controller 500 may be implemented as a module separate from the antenna module 110 or may be implemented as a module integrated with the electronic control unit (ECU) of the vehicle 1.

The controller 500 may be implemented as a memory for storing an algorithm for controlling the operations of components inside the antenna apparatus 100 or data for a program reproducing the algorithm and a processor for performing the above-described operations using data stored in the memory. In the instant case, the memory and the processor may be implemented as separate chips. Alternatively, the memory and the processor may be implemented as a single chip.

The controller 500 may transmit a signal to the electronic control unit (ECU) or the terminal. In the instant case, the signal may be transmitted using a controller area network (CAN) communication method. Furthermore, the controller 500 may receive a command received from an input device of the vehicle 1 in various receiving methods such as CAN communication.

The controller 500 may control light emission of the light emitting element 140 included in the light emitting module 130 of the antenna apparatus 100 when the signal of the smart key is received through the antenna 120.

The controller 500 may control the light emitting element 140 to output light of a predetermined color based on a strength of the signal of the smart key received through the antenna 120.

For example, the controller 500 may determine a distance between the smart key and the vehicle 1 based on the strength of the signal of the smart key received through the antenna 120, and may control the light emitting element 140 to output light of the predetermined color based on the distance between the smart key and the vehicle 1.

The controller 500 may control the light emitting element 140 so that a predetermined visual image is formed outside with the light of the light emitting element 140.

The controller 500 may output a predetermined sound through the speaker 300 when receiving the signal of the smart key through the antenna 120, and may control the lamp 400 to emit light.

The vehicle 1 according to the exemplary embodiment of FIG. 3 described above may further include a communication device (also referred to as a communication circuit) for supporting establishment of a wireless and/or wired communication channel between the vehicle 1 and an external device, for example, an electronic device and an external server and performing communication through the established communication channel, and the antenna 120 may be included in the communication device of the vehicle 1.

Although the exemplary embodiment of FIG. 3 described above illustrates that the antenna module 110 and the antenna 120 are provided as separate components, according to another exemplary embodiment of the present disclosure, the antenna 120 may be included in the antenna module 110.

Furthermore, although the exemplary embodiment of FIG. 3 described above illustrates that the controller 500 is disposed in the vehicle 1, according to another exemplary embodiment of the present disclosure, the controller 500 may be included in the antenna apparatus 100 to generate various control signals for controlling components in the antenna apparatus 100.

FIG. 4, FIG. 5, FIG. 6 and FIG. 7 illustrate configurations of the antenna apparatus 100 according to an exemplary embodiment of the present disclosure.

Figure 4:
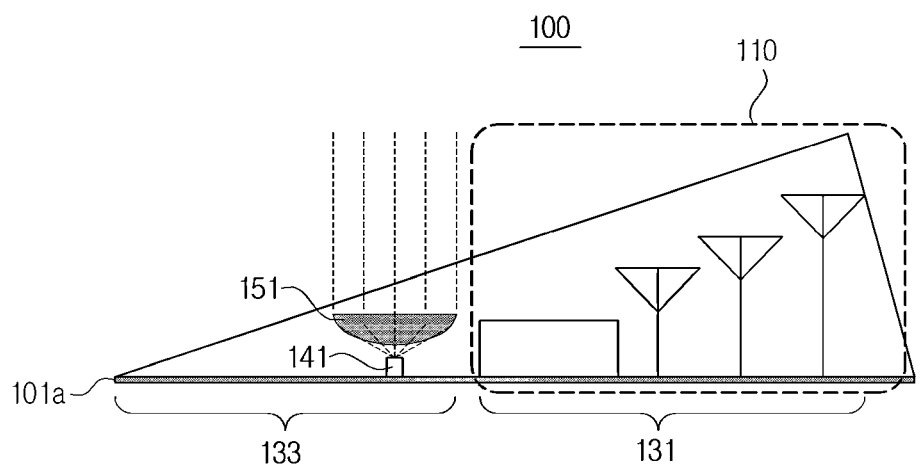
FIG. 4, FIG. 5, FIG. 6 and FIG. 7 illustrate configurations of the antenna apparatus according to an exemplary embodiment of the present disclosure.

Referring to FIG. 4, the antenna apparatus 100 may include the antenna module 110, the light emitting element 141, and/or the lens 151.

The antenna module 110 may be disposed on the first portion 131 of the bottom member 101a.

The light emitting element 141 may be disposed on the second portion 133 of the bottom member 101a.

The light emitting element 141, which is an element emitting light, may include a light emitting diode (LED) or the like. The light emitting element 141 may be mounted on a printed circuit board (PCB) or may be connected to a wiring.

The lens 151 may be disposed above the light emitting element 141 and is configured to collect light of the light emitting element 141 in an upper direction. The lens 151 may be integrally formed when the antenna cover 101b is injection molded, or may be separately mounted on an upper end portion of the light emitting element 141.

For example, the lens 151 may include a convex lens.

When the light emitting element 141 of the antenna apparatus 100 emits light under the control of the controller 500 in a stale in which the vehicle 1 including the antenna apparatus 100 as illustrated in FIG. 4 is parked in an indoor parking space such as an underground parking lot or a parking space with a ceiling, the lens 151 may collect the light of the light emitting element 141 in the upper direction so that the light reaches the ceiling.

For example, assuming that the vehicle 1 includes the antenna apparatus 100 having the configuration as illustrated in FIG. 4, when the driver presses the button on the smart key to find the own vehicle 1 parked in a parking space with a ceiling, the controller 500 may receive a signal of the smart key through the antenna 120 and control the light emitting element 141 of the antenna apparatus 100 to emit light. Accordingly, the driver may easily identify the location of the own vehicle 1 by checking the light projected on the ceiling of the parking space.

Figure 5:
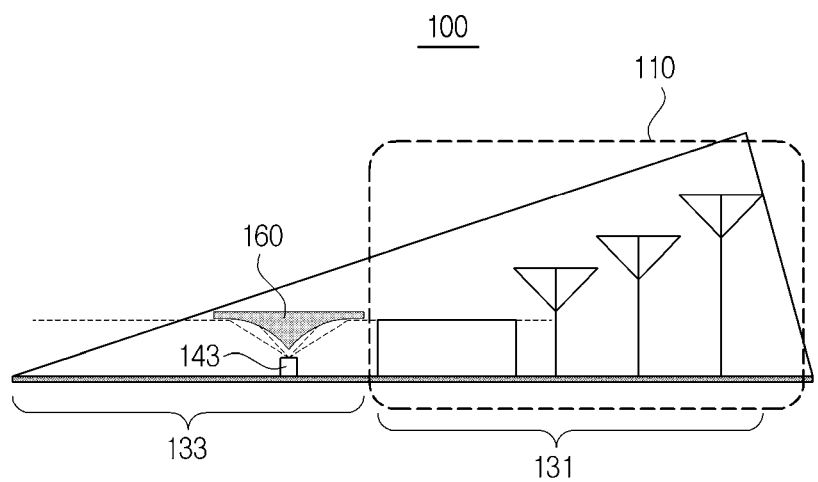

Referring to FIG. 5, the antenna apparatus 100 may include the antenna module 110, the light emitting element 143, and/or the reflector 160.

The antenna module 110 may be disposed on the first portion 131 of the bottom member 101a.

The light emitting element 143 may be disposed on the second portion 133 of the bottom member 101a.

The light emitting element 143, which is an element emitting light, may include a light emitting diode (LED) or the like. The light emitting element 143 may be mounted on a printed circuit board (PCB) or may be connected to a wiring.

The reflector 160 may be disposed above the light emitting element 143.

The reflector 160 may spread the light of the light emitting element 143 in all directions like a general non-directional dipole or monopole antenna. The reflector 160 may be made of a material configured for reflecting light, and a portion to which the light hits may have a concave shape so that the light of the light emitting element 143 may be spread in all directions.

The reflector 160 may include a mirror, and the mirror may be, for example, a concave mirror.

When the light emitting element 143 of the antenna apparatus 100 emits light under the control of the controller 500 in a state in which the vehicle 1 including the antenna apparatus 100 as illustrated in FIG. 5 is parked in a space without a ceiling, such as a large vacant lot, the reflector 160 may spread the light of the light emitting element 143 in all directions, so that a user may check the light of the vehicle 1.

For example, assuming that the vehicle 1 includes the antenna apparatus 100 having the configuration as illustrated in FIG. 5, when the driver presses the button on the smart key to find the own vehicle 1 parked in a large vacant lot, the controller 500 may receive a signal of the smart key through the antenna 120 and control the light emitting element 143 of the antenna apparatus 100 to emit light. Accordingly, the driver may easily identify the location of the own vehicle 1 by checking the light spreading in all directions.

Figure 6:
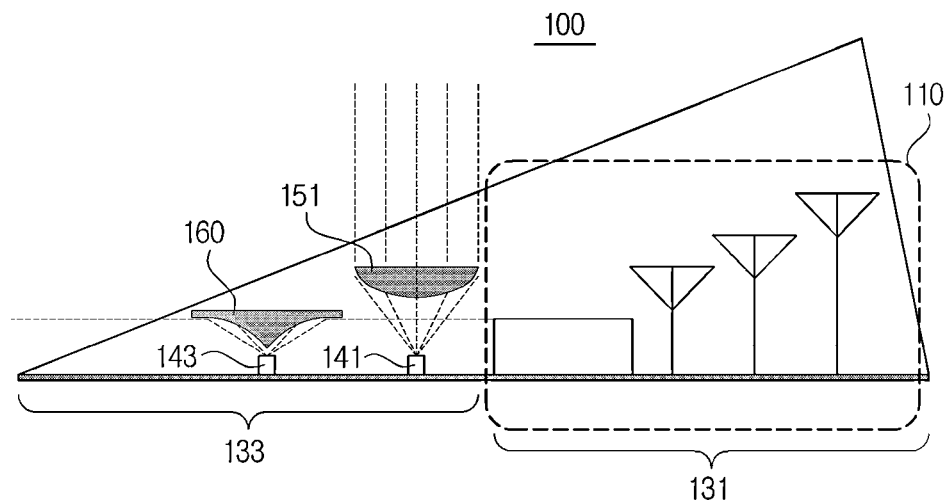

Referring to FIG. 6, the antenna apparatus 100 may include the antenna module 110, the light emitting elements 141 and 143, the lens 151, and/or the reflector 160.

The antenna module 110 may be disposed on the first portion 131 of the bottom member 101a.

The light emitting elements 141 and 143 may be disposed on the second portion 133 of the bottom member 101a.

The lens 151 may be disposed above the light emitting element 141.

The reflector 160 may be disposed above the light emitting element 143.

Because the antenna module 110, the light emitting elements 141 and 143, the lens 151, and the reflector 160 have been described in detail in the above embodiments, a detailed description thereof will be omitted.

As illustrated in FIG. 6, the vehicle 1 including the antenna apparatus 100 including the two light emitting elements 141 and 143 may select one of the two light emitting elements 141 and 143 to output light or select both the light emitting elements 141 and 143 to output light, depending on a condition specified in advance by the vehicle 1.

For example, assuming that the vehicle 1 includes the antenna apparatus 100 having the configuration as illustrated in FIG. 6, the driver may selectively cause one of the two light emitting elements 141 and 143 to output light depending on a place where the own vehicle 1 is parked.

For example, the smart key of the vehicle 1 may include a first button (also referred to as a button for indoor parking) and a second button (also referred to as a button for outdoor parking).

For example, when the driver parks the own vehicle 1 in an indoor parking space and presses the first button of the smart key, the controller 500 may receive a first signal corresponding to the first button. The controller 500 may control the light emitting element 141 of the two light emitting elements 141 and 143 to output light based on the reception of the first signal. Accordingly, the driver may identify the location of the own vehicle 1 by checking the light projected on a ceiling of the indoor parking space.

Furthermore, when the driver parks the own vehicle 1 in a wide open space and presses the second button of the smart key, the controller 500 may receive a second signal corresponding to the second button. The controller 500 may control the light emitting element 143 of the two light emitting elements 141 and 143 to output light based on the reception of the second signal. Accordingly, the driver may identify the location of the own vehicle 1 by checking the light spreading in all directions.

As an exemplary embodiment of the present disclosure, the controller 500 of the vehicle 1 may determine whether the parking location of the vehicle 1 is an indoor space or an outdoor space, and may control one of the two light emitting elements 141 and 143 to output light depending on the determination result.

The controller 500 may identify that the vehicle 1 is located in an indoor space or an outdoor space based on a GPS signal received through the antenna apparatus 120 or location information of a navigation device of the vehicle 1. For example, the controller 500 may identify that the vehicle 1 is located in an indoor space or an outdoor space when receiving a signal from the smart key through the antenna 120.

When the driver presses the button of the smart key, the controller 500 may receive a signal from the smart key and identify that the vehicle 1 is located in an indoor space or outdoor space.

When the vehicle 1 is located in an indoor space, the controller 500 may, control the light emitting element 141 of the two light emitting elements 141 and 143 to Output light based on the signal received from the smart key.

When the vehicle 1 is located in an outdoor space, the controller 500 may control the light emitting element 143 of the two light emitting elements 141 and 143 to output light based on the signal received from the smart key.

Figure 7:
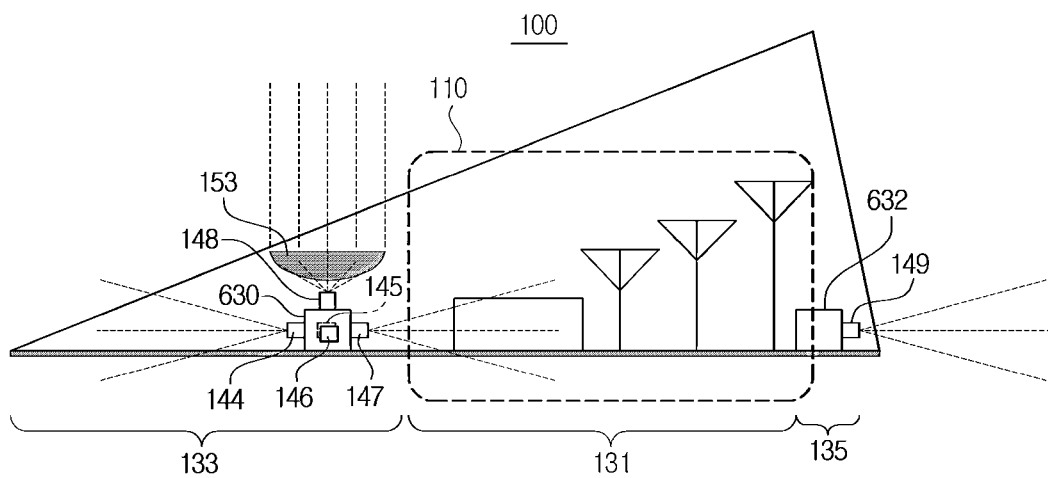

Referring to FIG. 7, the antenna apparatus 100 may include the antenna module 110, a plurality of light emitting elements 144, 145, 146, 147, 148, and 149, and/or the lens 153.

The antenna module 110 may be disposed on the first portion 131 of the bottom member 101a.

The plurality of light emitting elements 144, 145, 146, 147, and 148 may be disposed on the second portion 133 of the bottom member 101a.

For example, the support member 630 is disposed on the second portion 133 of the bottom member 101a so that the plurality of light emitting elements 144, 145, 146, 147, and 148 is disposed on sides and an upper end portion of the support member 630, that is, disposed in a cubic shape, causing light to be emitted in all directions similarly to the reflector 160 in FIGS. 4 and/or 5.

The lens 153 may be disposed above the support member 630 on which the plurality of light emitting elements 144, 145, 146, 147, and 148 is disposed.

The lens 153 may be a lens similar to (or identical to) the lens 151 of FIG. 3 described above.

The light emitting element 149 may be disposed on a third portion 135 of the bottom member 101a.

For example, a support member 632 may be disposed on the third portion 135 of the bottom member 101a so that the light emitting element 149 may be disposed on one side (or rear side) of the support member 632.

For example, the support member 632 on which the light emitting element 149 is disposed may be disposed at the rear of the antenna apparatus 100 so that, when the antenna apparatus 100 is attached to the vehicle 1, light may be radiated to the rear of the vehicle 1.

For example, assuming that the vehicle 1 includes the antenna apparatus 100 including the configuration as illustrated in FIG. 7, when the driver presses the button on the smart key to find the own vehicle 1, the controller 500 may receive a signal of the smart key through the antenna 120 and control the plurality of light emitting elements 144, 145, 146, 147, and 148 and/or the light emitting element 149 of the antenna apparatus 100 to input light.

Although FIG. 4 illustrates that the antenna apparatus 100 includes the one light emitting element 141, as another exemplary embodiment of the present disclosure, the antenna apparatus 100 may be implemented as a configuration of including a plurality of light emitting elements and in which the lens 151 is disposed above the plurality of light emitting elements.

Also, although FIG. 5 illustrates that the antenna apparatus 100 includes the one light emitting element 143, as another exemplary embodiment of the present disclosure, the antenna apparatus 100 may be implemented as a configuration of including a plurality of light emitting elements and in which the reflector 160 is disposed above the plurality of light emitting elements.

Also, although FIG. 6 illustrates that the antenna apparatus 100 includes the one light emitting element 141 disposed below the lens 151 and the one light emitting element 143 disposed below the reflector 160, as another exemplary embodiment of the present disclosure, the antenna apparatus 100 may be implemented as a configuration of including a plurality of light emitting elements disposed below the lens 151 and a plurality of light emitting elements disposed below the reflector 160.

Also, the number of the plurality of light emitting elements 144, 145, 146, 147, and 148 and the arrangement form of the plurality of light emitting elements 144, 145, 146, 147, and 148 disposed on the support member 630, which are illustrated in FIG. 7, may be variously changed. Also, although FIG. 6 illustrates that the antenna apparatus 100 includes the one light emitting element 149 disposed on the third portion 135, as another exemplary embodiment of the present disclosure, a plurality of light emitting elements may be provided.

Also, at least one component may be added or removed depending on the performance of the components of the vehicle 1 or the antenna apparatus 100 in the above-described embodiments. It will be readily understood by those skilled in the art that the mutual positions of the components may be changed depending on the performance or structure of the system.

Some components of the vehicle 1 or the antenna apparatus 100 may be software and/or hardware components such as a field programmable gate array (FPGA) and an application specific integrated circuit (ASIC).

Figure 8:
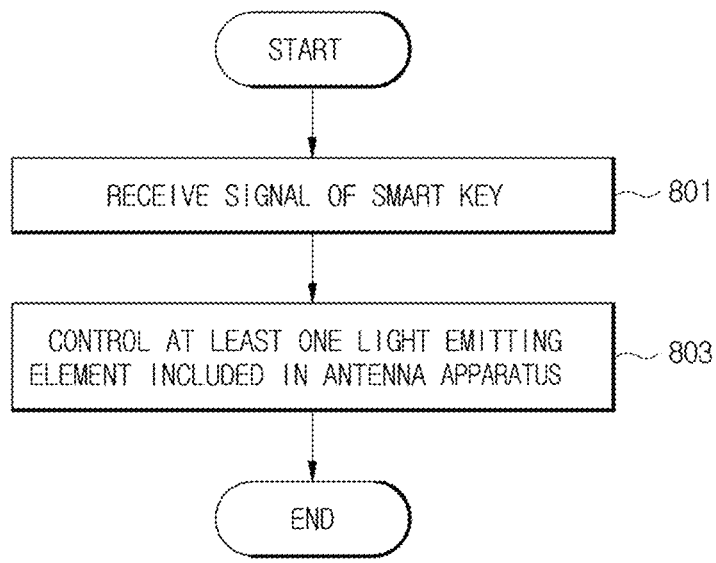
FIG. 8 is a flowchart of an operation of the vehicle according to an exemplary embodiment of the present disclosure.
Figure 9:
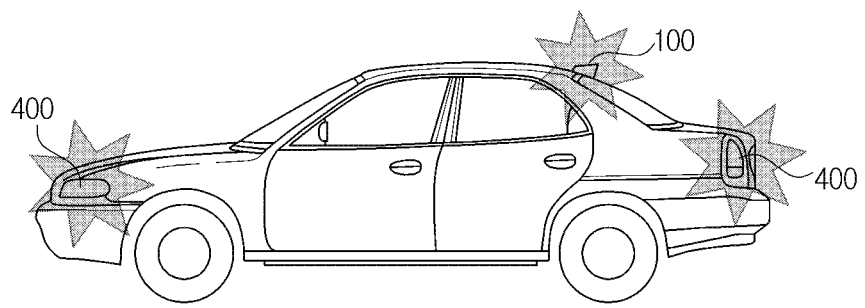
FIG. 9 illustrates light emission of the antenna apparatus and lamps in response to reception of a signal of a smart key of the vehicle according to an exemplary embodiment of the present disclosure.
Figure 10:
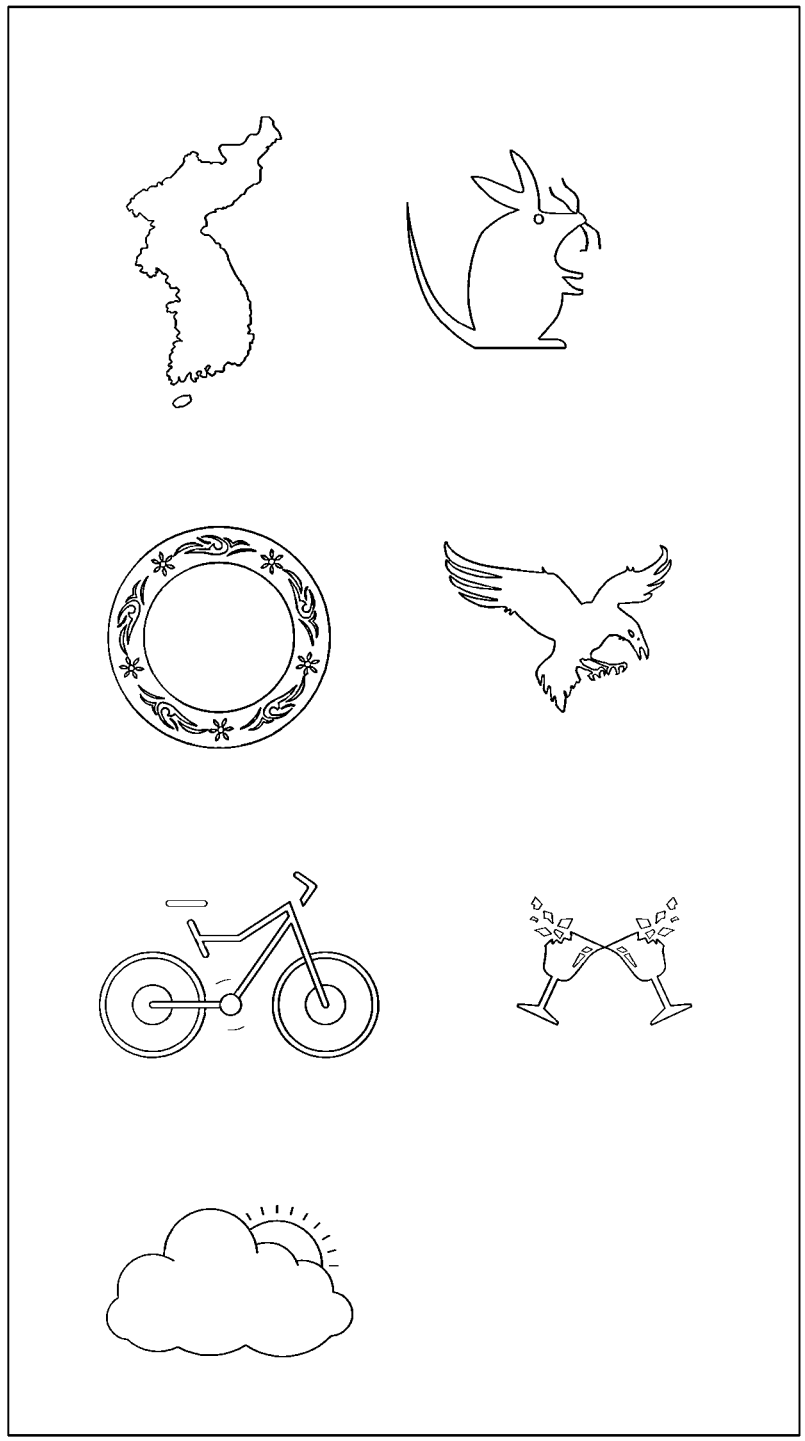
FIG. 10 is a diagram illustrating predetermined visual images to be formed outside in response to the light emission of the antenna apparatus of the vehicle according to an exemplary embodiment of the present disclosure.

FIG. 8 is a flowchart of an operation of the vehicle 1 (and/or the controller 500 of the vehicle 1) according to an exemplary embodiment of the present disclosure. FIG. 9 illustrates light emission of the antenna apparatus 100 and the lamps 400 in response to reception of a signal of a smart key of the vehicle 1 according to an exemplary embodiment of the present disclosure. FIG. 10 is a diagram illustrating predetermined visual images to be formed outside in response to the light emission of the antenna apparatus 100 of the vehicle 1 according to an exemplary embodiment of the present disclosure.

Referring to FIG. 8, the vehicle 1 may receive a signal of the smart key through the antenna 120 of the vehicle 1 (801).

The vehicle 1 may control at least one of the light emitting elements included in the antenna apparatus 100 to emit light when receiving the signal of the smart key through the antenna apparatus 100 (803).

For example, when receiving the signal of the smart key through the antenna apparatus 100, as illustrated in FIG. 9, the vehicle 1 may control at least one of the light emitting elements included in the antenna apparatus 100 to emit light and control the lamps 400 of the vehicle 1 to emit light. Accordingly, because the antenna apparatus 100 mounted on the roof panel of the vehicle 1 as well as front and rear surfaces of the vehicle 1 emits light, the driver may easily find the location of the vehicle 1.

Additionally, the vehicle 1 may output the predetermined sound through the speaker 300 of the vehicle 1 upon reception of the signal of the smart key through the antenna apparatus 100.

For example, the vehicle 1 may control at least one of the light emitting elements included in the antenna apparatus 100 so that any one of the predetermined visual images, as illustrated in FIG. 10, is formed outside by the light of the at least one light emitting element.

Therefore, when the light of the at least one light emitting element included in the antenna apparatus 100 is output in the direction of a ceiling, images of various shapes may be projected on the ceiling to produce effects such as floor advertisements.

For example, the vehicle 1 may change the color of light to be output from the antenna apparatus 100 depending on the distance between the smart key and the vehicle 1.

For example, when the distance between the vehicle 1 and the smart key is within a short first distance range, the vehicle 1 may control at least one of the light emitting elements included in the antenna apparatus 100 so that the antenna apparatus 100 outputs blue light having a short wavelength.

Furthermore, when the distance between the vehicle 1 and the smart key is within a long first distance range, the vehicle 1 may control at least one of the light emitting elements included in the antenna apparatus 100 so that the antenna apparatus 100 outputs red light having a long wavelength.

With these colors of light, the vehicle 1 may provide information about how far away the vehicle 1 is to the driver holding the smart key.

When an output of the radio wave radiated from the smart key is known and a strength of the radio wave received from the antenna 120 of the vehicle 1 is known, an approximate distance between the vehicle 1 and the smart key may be determined by the FRISS formula of Equation 1 below $$P_r = P_t + D_t + D_r + 20\log_{10}\left(\frac{\lambda}{4\pi d}\right)$$ [Equation 1]

(Pr: transmission power, Pt: reception power, λ: wavelength of transmission frequency, Dt: gain of transmission antenna, Dr: gain of reception antenna, d: distance)

The vehicle 1 may provide information on the distance by controlling the color of light output from at least one light emitting element based on the distance determined as described above.

In other words, the vehicle 1 may control at least one of the light emitting elements included in the antenna apparatus 100 to output light of a predetermined color based on the strength of the signal of the smart key.

For example, the vehicle 1 may determine the distance between the smart key and the vehicle 1 based on the strength of the signal of the smart key and control at least one light emitting element to output light of the predetermined color based on the distance between the smart key and the vehicle 1.

The vehicle 1 may control at least one of the light emitting elements included in the antenna apparatus 100 so that light of a first color is output when the distance between the smart key and the vehicle 1 is included in the first distance range.

The vehicle 1 may control at least one of the light emitting elements included in the antenna apparatus 100 so that light of a second color is output when the distance between the smart key and the vehicle 1 is included in the second distance range.

For example, when the antenna apparatus 100 of the vehicle 1 is the antenna apparatus 100 of FIG. 6 described above, the vehicle 1 may identify whether the signal of the smart key is the first signal or the second signal. The first signal may be a signal corresponding to the first button of the smart key (also referred to as the button for indoor parking), and the second signal may be a signal corresponding to the second button of the smart key (also referred to as the button for outdoor parking).

The vehicle 1 may control the light emitting element 141 of the two light emitting elements 141 and 143 to output light so that the light may be illuminated on a ceiling of an indoor parking space when the signal of the smart key is the first signal.

The vehicle 1 may control the light emitting element 143 of the two light emitting elements 141 and 143 to output light so that the light may spread in all directions when the signal of the smart key is the second signal.

For example, when the antenna apparatus 100 of the vehicle 1 is the antenna apparatus 100 of FIG. 6 described above, the vehicle 1 may identify whether the vehicle 1 is located in an indoor space or an outdoor space based on a GPS signal or location information of the navigation device.

Accordingly, the vehicle 1 may control the light emitting element 141 of the two light emitting elements 141 and 143 to output light so that the light may be illuminated on a ceiling of an indoor parking space when a signal is received from the smart key and the vehicle 1 is located in an indoor space.

Also, the vehicle 1 may control the light emitting element 143 of the two light emitting elements 141 and 143 to output light so that the light may spread in all directions when a signal is received from the smart key and the vehicle 1 is located in an outdoor space.

In addition to the above-described embodiments, the antenna apparatus 100 of the vehicle 1 may further include an infrared signal or electromagnetic wave signal transmitter together with the light emitting module 130 including the light emitting element 140. On the other hand, as some changes in the above-described embodiments, the antenna apparatus 100 of the vehicle 1 may include an infrared signal or electromagnetic wave signal transmitter instead of the light emitting module 130 including the light emitting element 140. When the vehicle 1 is configured as described above, the smart key of the vehicle 1 may include the configuration illustrated in FIG. 11.

Figure 11:
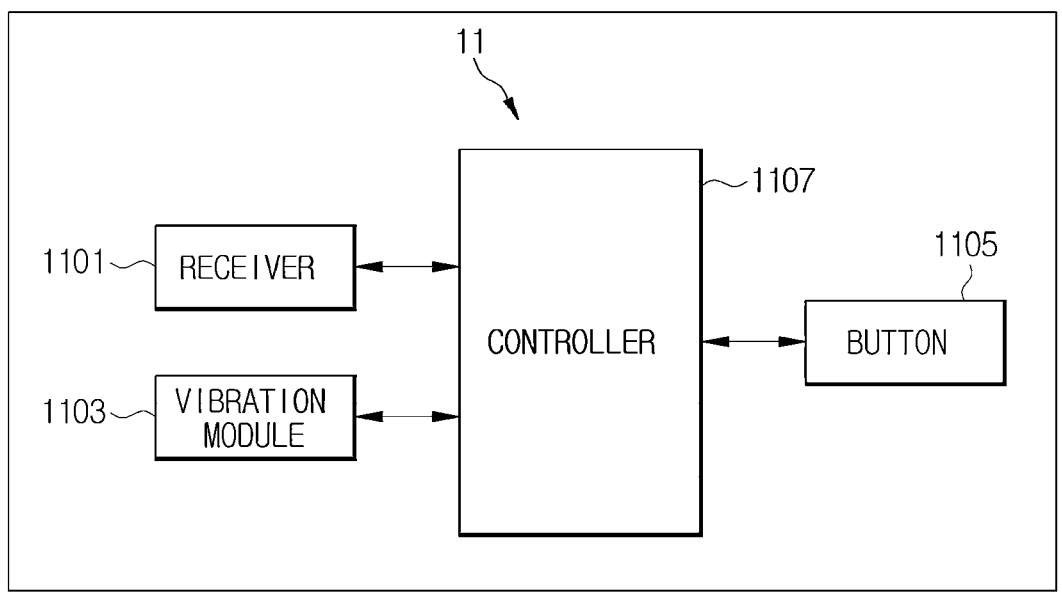
FIG. 11 is a block diagram of the smart key according to an exemplary embodiment of the present disclosure.

FIG. 11 is a block diagram of the smart key according to an exemplary embodiment of the present disclosure.

Referring to FIG. 11, a smart key 11 of the vehicle 1 may include a receiver 1101, a vibration module 1103, a button 1105, and/or a controller 1107.

The receiver 1101 may also be referred to as a directional receiver, and may receive a signal output from the infrared signal or electromagnetic wave signal transmitter of the vehicle 1.

The vibration module 1103 may be configured to vibrate the smart key 11.

The button 1105 may include a door open button and/or a door lock button of the vehicle 1.

The controller 1107 may be implemented as a memory for storing an algorithm for controlling the operations of components inside the smart key 11 or data for a program reproducing the algorithm and a processor for performing the above-described operations using data stored in the memory. In the instant case, the memory and the processor may be implemented as separate chips. Alternatively, the memory and the processor may be implemented as a single chip.

The controller 1107 may control the vibration module 1103 to vibrate the smart key 11 when receiving the signal from the infrared signal or electromagnetic wave signal transmitter of the vehicle 1 through the receiver 1101.

When the vehicle 1 is located in a direction in which the smart key 11 of the vehicle 1 having the above configuration faces, the smart key 11 may receive the signal from the infrared signal or electromagnetic wave signal transmitter of the vehicle 1 through the receiver 1101. The smart key 11 may control the vibration of the vibration module 1103 of the smart key 11 based on reception of the signal from the infrared signal or electromagnetic wave signal transmitter.

Because the smart key 11 receives the signal of the vehicle 1 only when the direction of the smart key 11 that is, the direction of the receiver 1101 of the smart key 11 faces direction of the vehicle 1, that is, the direction of the infrared signal or electromagnetic wave signal transmitter of the vehicle 1 and generates vibration, the driver holding the smart key 11 may check in which direction the vehicle 1 is located about the driver.

As is apparent from the above, a vehicle, a control method thereof, and an antenna apparatus according to an exemplary embodiment of the present disclosure can facilitate a user to check a location of the vehicle by manipulating a smart key.

Therefore, the user can easily find the own vehicle by manipulating the smart key in large parking lots of large shopping malls, airports, and/or stadiums, improving the convenience of the user.

The disclosed exemplary embodiments of the present disclosure may be implemented in a form of a recording medium storing instructions executable by a computer. The instructions may be stored in a form of program code, and when executed by a processor, a program module may be generated to perform the operations of the disclosed exemplary embodiments of the present disclosure. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   an antenna apparatus including an antenna module and at least one light emitting element, the antenna apparatus being mounted on a roof panel of the vehicle;
   an antenna configured to receive a signal of a smart key; and
   a controller configured to control light emission of the at least one light emitting element included in the antenna apparatus when the signal is received through the antenna,
   wherein the at least one light emitting element includes at least one first light emitting element and at least one second light emitting element,
   wherein the antenna apparatus further includes a lens mounted above the at least one first light emitting element and a reflector mounted above the at least one second light emitting element, and
   wherein the controller is configured to identify whether the vehicle is located in an indoor space or an outdoor space based on a signal of a satellite navigation system received through the antenna, to control light emission of the at least one first light emitting element based on the signal received through the antenna when the vehicle is located in the indoor space, and to control light emission of the at least one second light emitting element based on the signal received through the antenna when the vehicle is located in the outdoor space.

2. The vehicle of claim 1, wherein the controller is configured to control the at least one light emitting element to output light of a predetermined color based on a strength of the signal received through the antenna.

3. The vehicle of claim 2, wherein the controller is configured:
   to determine a distance between the smart key and the vehicle based on the strength of the signal received through the antenna; and
   to control the at least one light emitting element to output light of the predetermined color based on the distance between the smart key and the vehicle.

4. The vehicle of claim 1, wherein the controller is configured to control the at least one light emitting element so that a predetermined visual image is formed outside by the light of the at least one light emitting element.

5. The vehicle of claim 1, wherein the controller is configured:
   to control light emission of the at least one first light emitting element based on a first signal of the smart key received through the antenna; and
   to control light emission of the at least one second light emitting element based on a second signal of the smart key received through the antenna.

6. The vehicle of claim 1, further including:
   a speaker; and
   a plurality of lamps disposed on a front portion and a rear portion of the vehicle,
   wherein the controller is configured to output a predetermined sound through the speaker when the signal is received through the antenna, and is configured to control the plurality of lamps to emit light.

7. A method of controlling a vehicle, the method comprising:
   receiving, by a controller, a signal of a smart key through an antenna of the vehicle; and
   controlling, by the controller, at least one light emitting element included in an antenna apparatus mounted on a roof panel of the vehicle to emit light in response to the receiving of the signal of the smart key,
   wherein the at least one light emitting element includes at least one first light emitting element and at least one second light emitting element,
   wherein the control method further includes identifying whether the vehicle is located in an indoor space or an outdoor space based on a signal of a satellite navigation system received through the antenna apparatus, and
   wherein the controlling of the at least one light emitting element to emit light includes:

controlling light emission of the at least one first light emitting element based on the signal of the smart key when the vehicle is located in the indoor space; and controlling light emission of the at least one second light emitting element based on the signal of the smart key when the vehicle is located in the outdoor space.

8. The method of claim 7, wherein the controlling of the at least one light emitting element to emit light includes controlling the at least one light emitting element to output light of a predetermined color based on a strength of the signal of the smart key.

9. The method of claim 8, wherein the controlling of the at least one light emitting element to emit light includes:

determining a distance between the smart key and the vehicle based on the strength of the signal of the smart key; and controlling the at least one light emitting element to output light of the predetermined color based on the distance between the smart key and the vehicle.

10. The method of claim 7, wherein the at least one light emitting element includes at least one first light emitting element and at least one second light emitting element, and wherein the controlling of the at least one light emitting element to emit light includes:

controlling light emission of the at least one first light emitting element when the signal of the smart key is a first signal; and controlling light emission of the at least one second light emitting element when the signal of the smart key is a second signal.

\* \* \* \* \*